United States Patent [19]

Atsumi et al.

[11] Patent Number: 5,034,597
[45] Date of Patent: Jul. 23, 1991

[54] IC CARDS AND INFORMATION STORAGE CIRCUIT THEREFOR

[75] Inventors: Shiro Atsumi; Shintaro Kotani; Sadao Watahiki; Kohji Tanagawa, all of Tokyo, Japan

[73] Assignee: Oki Electric Industry Co., Ltd., Tokyo, Japan

[21] Appl. No.: 193,685

[22] Filed: May 13, 1988

[30] Foreign Application Priority Data

May 15, 1987 [JP] Japan .................................. 62-116895
Nov. 16, 1987 [JP] Japan .................................. 62-287232

[51] Int. Cl.⁵ .............................................. G06K 5/00
[52] U.S. Cl. .................................. 235/380; 235/379; 235/492
[58] Field of Search ..................... 235/379, 380, 492; 307/605

[56] References Cited

U.S. PATENT DOCUMENTS 4,105,156  8/1978  Dethloff .
4,747,050  5/1988  Brachtl et al. ................... 235/382 X
4,816,653  3/1989  Anderl et al. ........................ 235/380
4,839,506  6/1989  Homma et al. ...................... 235/379

FOREIGN PATENT DOCUMENTS 0058029   8/1982  European Pat. Off. .
0167044   1/1986  European Pat. Off. .
0173103   3/1986  European Pat. Off. .
0182244   5/1986  European Pat. Off. .
0196028  10/1986  European Pat. Off. .
0197535  10/1986  European Pat. Off. .
0216375   4/1987  European Pat. Off. .
61-5389   1/1986  Japan .

Primary Examiner—David Trafton
Attorney, Agent, or Firm—Wenderoth, Lind & Ponack

[57] ABSTRACT

An IC card having a self-identification function in the card itself includes an input key for inputting a personal identification number (PIN), a comparator for comparing the PIN input via the input key with a prerecorded PIN. A transaction condition signal is produced when a match is found. An external terminal is provided for outputting to the outside of the card, e.g. a bank terminal, to enable a transaction using of the the card. An information storage circuit suitable for use in the IC card is also disclosed.

10 Claims, 3 Drawing Sheets

FIG.IA
FIG.IB
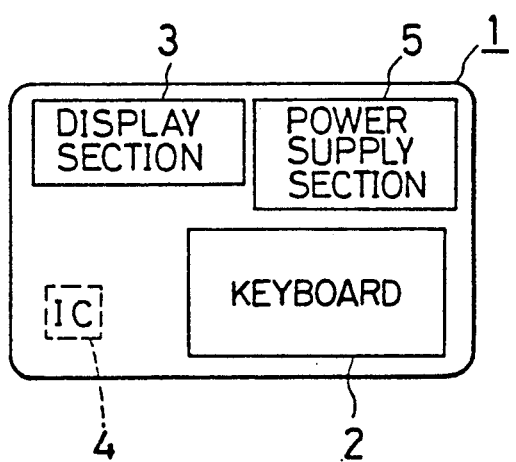
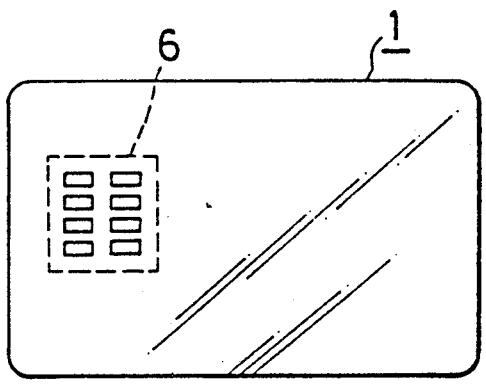

IC CARDS AND INFORMATION STORAGE CIRCUIT THEREFOR

BACKGROUND OF THE INVENTION

This invention relates to an IC card which protects against misuse by incorporating a self-identification function into the card itself.

This invention also relates an information storage circuit suitable for use in IC cards or the like employing a solar battery. The information storage circuit can keep the stored information intact even if the voltage of the power supply fluctuates due to its dependence on a solar battery.

An example of an IC (integrated circuit) card is disclosed in Japanese Laid-Open Patent Application No. 1986/5389. The IC card disclosed therein includes a data input means, a data display means, and a power supply means and having built-in self-identification features. In other words, a password or personal identification number (PIN) is input by using a keyboard integrated into the card, and, this input personal identification number is compared with a personal identification number already stored in an internal electrically erasable read only memory (EEPROM) of the card. If the two numbers match, it means that the user of the card is its legitimate owner. Therefore, before making a transaction by using this type of IC card, the user inputs his personal identification number, using the keyboard of the card, and, after entering this personal identification number, the user presses the 'MATCH' key on the keyboard of the card to initiate the comparison of the personal identification number just entered with the identification number already stored in the card. If the two numbers match, an 'OK' message is displayed on a liquid crystal display of the card for a duration of about 10 seconds, indicating that the user of the card is the legitimate owner of the card. The card can then be used to make the transaction, only within the time interval during which the 'OK' message is being displayed. If the two numbers do not match, this 'OK' message is not displayed and the card counts up a counter in the EEPROM of the card which contains the number of times this mis-match occurred. Moreover, a message requesting the user to re-input the personal identification number is displayed on the display means of the card.

However, in the type of the identification card described above, since the duration for which the card is usable for making a transaction after inputting the correct personal identification number is as short as 10 seconds, the card is associated with the following problems: (1) The transaction-enabling duration may be over while the user is queuing in front of the counter after the transaction OK is set. In such a case, the personal identification number must be input again. (2) Moreover, the card owner must input his personal identification number in the vicinity of the terminal device such as ATM, and the personal identification number may be divulged to others.

Moreover, where the power supply of the prior art IC cards is a solar battery, as in Japanese Utility Model Application No. 1987/68811, if the card is passed through the dark when inserted into the bank terminal, the power supply voltage drops, and as a result, the above mentioned 'OK' message disappears. This problem also occurs whenever the power supply voltage drops as a result of insufficient amount of light for the solar battery, for example when the card is turned over or is kept in a pocket.

The simplest way to solve this problem is to employ an ordinary battery in the IC card instead of the solar battery, and then us a monostable multivibrator circuit to hold the output signal active for a fixed time interval. However, this method is not practicable since interchanging the battery cells in the IC card is a cumbersome process.

For devices like IC cards, the output signal must be held active for a fixed time interval, after which it should be automatically deactivated. Such devices are generally affected by a drop in the power supply voltage.

SUMMARY OF THE INVENTION

An object of this invention is to provide an IC card which solves the above-described problems.

Another object of the present invention is to provide an information storage circuit which is not affected by fluctuations of the power supply voltage.

According to one aspect of the present invention, there is provided an IC card having a self-identification function in the card itself, comprising:

an input means for inputting a personal identification number;

a means for comparing the personal identification number input via the input means with a personal identification number prerecorded in the IC card;

a transaction condition signal generator for producing a signal permitting a transaction using the card when a match is found by the comparing means, and an external terminal for outputting to the outside of the card said signal produced by said transaction condition signal generator.

The input means can be used to input a command to select the transaction mode and input the personal identification number. The comparing means compares this personal identification number entered via the input means with the personal identification number already stored in the card. If the two personal identification numbers match, a transaction condition signal generator produces a signal. This signal is output through the external terminal, so that it can be fed to a bank terminal into which the card is inserted. The signal generator can be a personal identification number match memory which stores the data to that effect until a transaction in completed or a timer circuit stores the same data for a fixed time interval. For systems in which simpler operations are preferred, either one of the outputs of the memory and the timer circuit is used as a condition to enable transaction. For systems in which tight security is desired, both of the outputs are used as the condition to enable transaction. The reason is explained below.

When the personal identification number match memory means is once set it remains set until the transaction is made at the terminal device such as the ATM. This feature solves the above-described problem associated with the prior art. However, on the other hand, if the card is lost when it is in the set state, it can be used, although only once, by an unauthorized person. In order to overcome this drawback, the IC card of the present invention may be configured to enable the transaction by the logical 'AND' of the above mentioned output of the personal identification number match memory means and the output of the timer circuit.

According to another aspect of the invention, there is provided an information storage circuit comprising a first FET with its gate connected to an input terminal, and its drain connected to a power supply;

a capacitor connected between the source of the first FET and the ground;

a second FET with its gate connected to the source of the first FET, its source grounded and its drain connected to an output terminal, and a means for applying a pulse to the input terminal when a match is found by said comparing means;

wherein, when the pulse is applied to the input terminal, information is maintained at the output terminal for a predetermined time determined by the capacitance of the capacitor and the leakage current even if the voltage of the power supply disappears or drops.

When a high potential pulse is applied to the input terminal, the first FET is turned ON and the capacitor is charged up to the power supply voltage. Since the source of the first FET connected to the capacitor is also connected to the gate of the second FET, the second FET also becomes ON, and the output terminal of the circuit becomes LOW. The voltage at the output terminal remains at the LOW level for a fixed time interval, even after the high potential pulse at the input terminal has disappeared, and until the capacitor is discharged by the leakage current of the FET. Moreover, since the power supply is isolated from the capacitor through the first and second FETs, the "LOW" output voltage is not affected by the disappearance or drop in the voltage of the power supply.

BRIEF DESCRIPTION OF THE INVENTION

FIG. 1A and FIG. 1B are perspective views, as seen from the front and the back, respectively, of an IC card of an embodiment of the present invention.

DETAILED DESCRIPTION OF THE EMBODIMENTS

Figure 2:
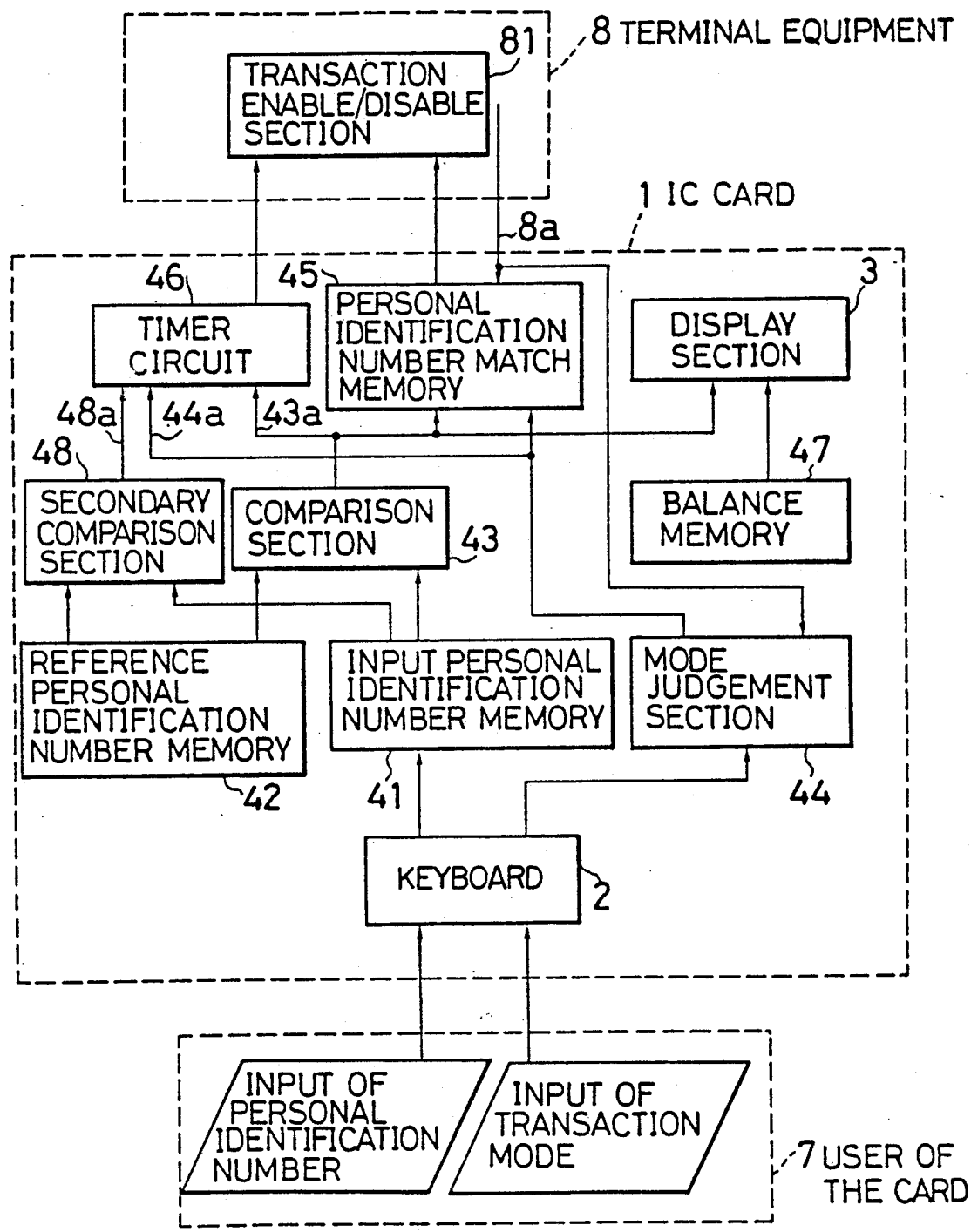
FIG. 2 is a functional block diagram of the IC card of FIG. 1A and FIG. 1B.

FIG. 1A is a perspective view, as seen from the front, of an IC card of an embodiment of the present invention. FIG. 1B is a perspective view, as seen from the back, of the IC card. In these figures, the reference numeral 1 designates an IC card; 2 is a keyboard for entering the personal identification number and for commanding various functions to be performed including commanding selection of the transaction mode; 3 is a display section for display for the purpose of confirmation of the key input, and for display of guidance for the purpose of instructing the procedure of operation of the keys. This display section can be formed of, for example, the standard liquid crystal displays (abbreviated as LCD hereinafter).

An IC 4 is a microcomputer which comprises a central processing unit (CPU) for performing various control operations, a memory, and the like in a single chip. The microcomputer is built into the card itself. A power supply section 5 is used to supply electric power to various internal circuits of the IC card when the card is used separately from the terminal equipment such as ATM. This power supply sections can be formed of, for example, a solar battery. The mode of the operation in which the card operates without being electrically connected to external devices is referred to as the offline operation mode. The numeral 6 designates connectors used for connections of the IC card with a card reader/writer to exchange information with external terminal equipment. The mode of the operation in which the card operate exchanging information with an external device is referred to as the online operation mode.

FIG. 2 is a functional block diagram of an embodiment of the IC card of the present invention. In this figure, the user of the card, designated by the numeral 7, first commands the transaction mode by operating the keyboard 2 of the IC card 1. This command sets the mode judgement section 44, which remains set until a transaction is completed. Subsequently, the user inputs his personal identification number. The input personal identification number is then stored in the input personal identification number memory 41, which is constructed of an internal random access memory (referred to as RAM hereinafter) of the IC 4. The comparison section 43 compares this personal identification number with a reference personal identification number registered in a reference personal identification number memory 42, which is constructed of an internal electrically erasable programmable read only memory (EEPROM) of the IC 4. The function of the comparison section 43 can be realized by a program stored in the internal read only memory (referred to as ROM hereinafter) of the IC 4. If the comparison of these two numbers by the comparison section 43 finds a match, a pulse signal "1" is produced from the comparison section 43, and by the logical product of this output and the output from the mode judgement section 44, a logical '1' is set in the personal identification number match memory 45 which is constructed of an internal EEPROM of the IC 4. At the same time, this match of the numbers also results in the triggering of the timer circuit 46. The function of the mode judgement section 44 can be realized by a program stored in the internal ROM of the IC 4. The timer circuit 46 can be formed, for example, of a fixed time constant circuit and a switching circuit in which a capacitor is rapidly charged while the "MATCH" signal is output, and after that the capacitor is discharged over a predetermined time. These circuits may be built in the IC 4. The 'MATCH' output of the comparison section 43 is fed to the display unit as well. This gives permission of display, on condition of the personal identification number match, of the balance stored in a balance memory 47, which is formed in the internal EEPROM of the IC 4. Although not illustrated, when the comparison section 43 finds a mismatch, a counter, formed of a memory, for counting the number of erroneous inputs is incremented by one.

The outputs of the personal identification number match memory 45 and the timer circuit 46 are output through the connectors, so that they can be fed to a bank machine or terminal equipment 8 when the IC card is inserted in and electrically connected to the terminal equipment 8.

A transaction enable/disable section 81 of the terminal equipment 8 enables transaction only when the output of the personal identification number match memory 45 and the output of the timer circuit 46 are both set. In other words, it permits the transaction on the logical 'AND' condition of these two outputs. The personal identification number match memory 45 and the mode judgement section 44 are reset by a signal 8a from the terminal equipment 8 which is fed from the terminal equipment 8 through the connector, after the completion of each transaction.

In the foregoing explanation, it was mentioned that the operation of the timer circuit 46 is triggered by the 'MATCH' signal from the comparison section 43. However, the drawback in this mechanism is that if the prescribed valid time duration of the output of the timer circuit 46 is over before the user, having set the personal identification number match memory 45 by entering the correct personal identification number, inserts the IC card in the terminal equipment 8, the user has to input the personal identification number again, this time probably in front of the other people, e.g., in a crowded queue, so that the personal identification number may be seen by others. In order to eliminate this problem, it is desirable that a secondary comparison section 48 be provided and a secondary reference personal identification number be registered in the reference personal identification number memory 42 so that an input secondary personal identification number can be input and a "MATCH" output from the secondary comparison section 48 will re-start the time-counting operation of the timer circuit 46. Thus, this mechanism allows the user to set the personal identification number match memory 45 by entering the primary personal identification number at the user's home or the like in order to maintain the secrecy of the personal identification number, and then re-activate the output of the timer circuit 46 just before making the transaction by entering a simple secondary personal identification number, which can be, for example, even the initials of the card owner. Of course, the primary personal identification number can be used as the secondary personal identification number as well.

As has been described in detail, the above-described embodiment of the invention provides an IC card which comprises an input means, a display means, a power supply means, a personal identification number match memory means formed of a non-volatile memory for storing the input of the correct personal identification number through the input means, and a timer circuit means starting counting operation when the correct personal identification number is input, wherein the transaction is enabled only when both are set. The above-described embodiment is therefore applied to highly secure cash card systems or electronic passbook systems.

Although the previous explanation assumes that the personal identification number used for verification of the authorized owner is a number, in fact, any symbols other than numbers can equally be used as a personal identification number. The term "personal identification number" as used in the appended claims should therefore be construed to include such alternatives.

Moreover, the foregoing description relates to a configuration in which the IC 4 employs a single chip microcomputer, containing the CPU, the memory and the like. However, the IC may consists of plural chips and the CPU and the memory are built in separate chips.

Figure 3:
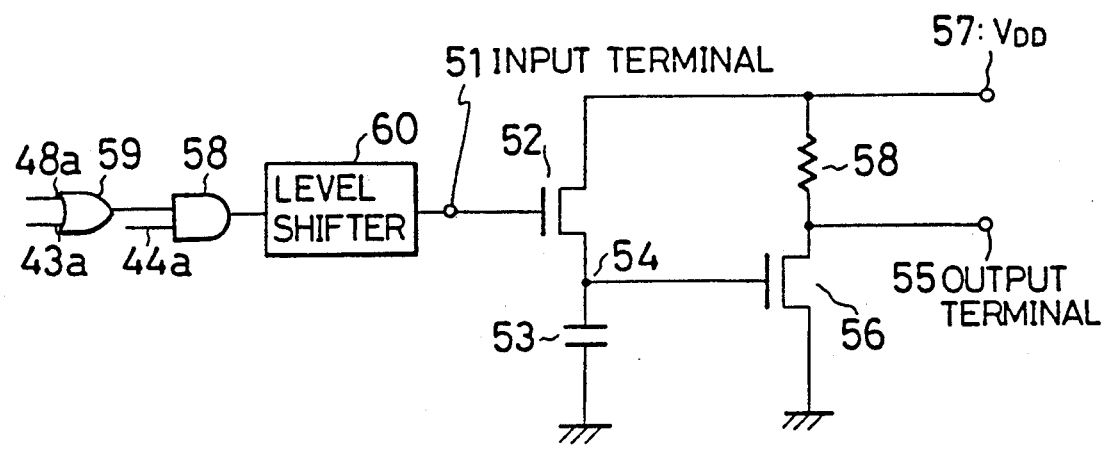
FIG. 3 is a circuit diagram of an information storage circuit which can be incorporated in the IC card of the embodiment of FIG. 1A, FIG. 1B and FIG. 2.

FIG. 3 is a circuit diagram of an example of the information storage circuit which can be used as part of the timer circuit section 46 in FIG. 2. The input terminal 51 is connected to the gate of a first FET 52; a power supply line $V_{DD}$ 57 is connected to the drain of the first FET 52; and a node 54 which is the source of the first FET 52 is grounded through the capacitor 53. The node 54 is also connected to the gate of a second FET 56. The drain of the second FET 56 is connected to the output terminal 55 and its source is grounded.

A resistor 58 is the load resistor of the second FET 56, and is connected between the source of the second FET 56 and the power supply line $V_{DD}$ 57.

The FETs of the above information storage circuit can be formed in a semiconductor chip of a single chip CMOS microcomputer. The first and the second FETs can be implemented by N-channel MOS FETs. The capacitor 53 can have a capacitance in the order of 30 pF, and it can be either internally incorporated into the chip or it can be externally provided. The load resistor 58 can be implemented by a MOS FET. The power supply $V_{DD}$ can be about 1.5 V in IC cards using a solar battery. The threshold voltage of the first FET 52 can be approximately 1.2 V due to the back-bias effect, and the threshold voltage of the second FET 56 can be approximately 0.8 V.

When the information storage circuit is incorporated in the timer circuit 46 of FIG. 2, the input terminal 51 is connected through a level shifter 60 to the output of an AND gate 58 having one input connected to the output 44a of the mode judgement section 44. The other input of the AND gate 58 is connected to the output of an OR gate 59 receiving the outputs 43a and 48a of the comparison section 43 and the secondary comparison section 48. Thus, the timer is triggered by the logical product of the output 44a of the made judgement section 43a and the logical sum of the outputs 44a and 48a of the comparison section 43 and the secondary comparison section 48.

Figure 4:
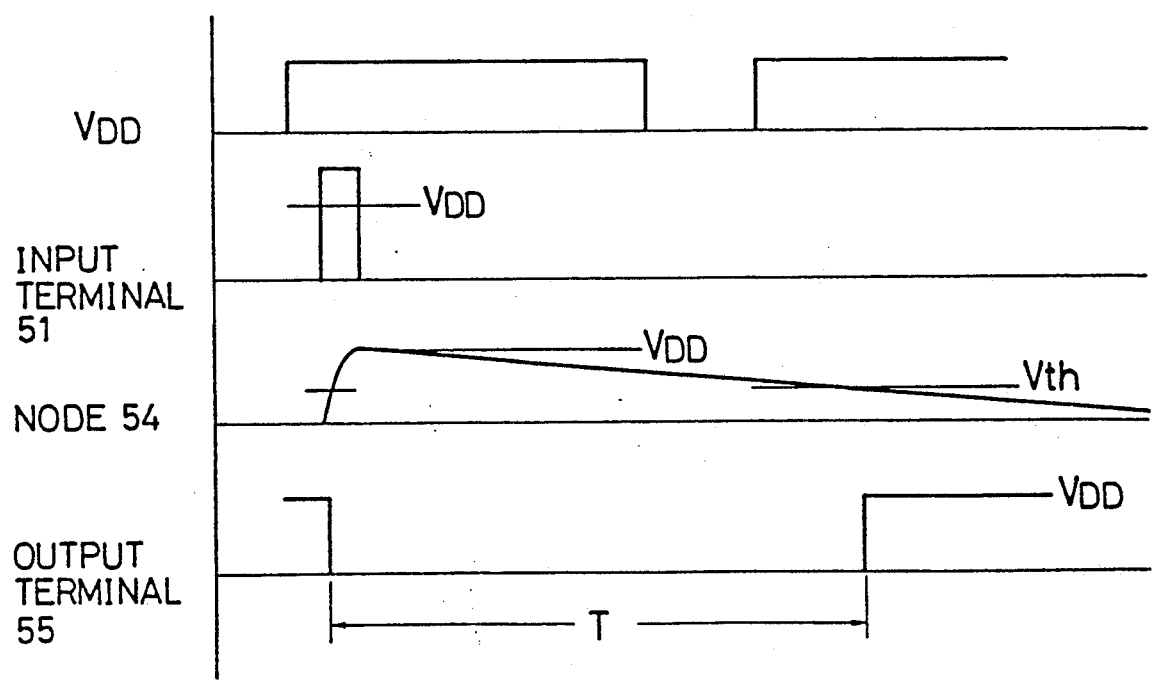
FIG. 4 is a time chart of the information storage circuit of the FIG. 3.

FIG. 4 shows a timing chart showing the operation of the information storage circuit. This diagram shows that the voltage of the power supply voltage $V_{DD}$, due to its dependence upon the solar battery, is about 1.5 V when the amount of light falling on the card is sufficient but it drops when the card is kept in a dark place.

A high potential pulse is applied to the input terminal 51. This signal can be generated, for example, when the microcomputer identifies the user by the personal identification number input through the keyboard and the 'Deposit Withdrawal OK' signal is output. This high potential pulse should be greater than the sum of the power supply voltage (1.5 V) and the threshold voltage of the first MOS FET (1.2 V). Therefore, this pulse should be higher than 2.7 V and preferably, higher than 3 V. The level shifter 60 is used to raise the level (1.5 V) of the output of the AND gate 58 to the level (3 V) required for input to the first FET 52.

By applying a pulse larger than the sum of the power supply voltage and the threshold of the first FET 52, the first FET 52 can be switched to a perfectly ON state, and as a result the capacitor 53 can be charged up to the voltage of the power supply $V_{DD}$. The voltage at the node 54 also rises up to the power supply voltage $V_{DD}$ due to the ON state of the first FET 52. When the voltage at the node 54 exceeds the threshold voltage of the second FET 56, the second FET 56 also switches ON, and the voltage at the output terminal 55 of the circuit becomes LOW. When the high voltage pulse at the input terminal disappears, the first FET 52 turns OFF, and the capacitor 53 is isolated from the power supply $V_{DD}$. However, irrespective of whether this capacitor is incorporated internally into the IC card or connected externally, a small leakage current exists between each electrode of the capacitor and the circuit board. The leakage resistance is of the order of $10^{10}$ to $10^{11}$ ohms. Moreover, there is leakage current through the FETs as well, but this is very small compared to the leakage current through the capacitor. Thus, the main source of the discharge current in this circuit is the leakage current through the capacitor. Therefore, the capacitor 53 is discharged mainly due to its own extremely small leakage current. As a result, the voltage at the node 54 drops gradually. The time during which the voltage at the node 54 reduces to about half depends upon the time constant which is determined by the leakage resistance and the capacitance of the capacitor 53 as follows.

$$T = 10^{11}(ohm) \times 30(pF) = 50(minutes)$$

During this time interval, the second FET 56 is in an ON state and the voltage at the output terminal 55 remains at the LOW level. Moreover, during this time interval, the voltage at the node 54 is completely isolated from the power supply voltage $V_{DD}$. Therefore, the voltage at the output terminal 55 remains at the LOW level even in case of disappearance of the power supply voltage $V_{DD}$ as shown in FIG. 4.

The LOW level state at the output terminal 55 can be used as a condition for 'Deposit Withdrawal OK'. During the time interval, in which the output terminal 55 is kept LOW, the card can be inserted in a bank terminal to withdraw cash from the desposit. Since the output signal automatically is deactivated after the time interval 'T' mentioned above, it is unlikely that the card be used by an unauthorized person in case of loss or the like.

The above mentioned time interval 'T' is not very accurate since it depends upon the leakage current of the capacitor. However, an insulation resistance of the order of $10^{10}$ to $10^{11}$ ohms can be achieved without difficulty for a 30 pF externally connected capacitor, giving a time interval of 30 minutes to one hour required for making transactions by using the card, during which the output signal remains LOW.

The LOW level output at the terminal 55 should preferably be used in combination with the HIGH level output of another circuit, e.g., the personal identification number match memory 45 in FIG. 2. That is the logical product (AND) of the LOW level (signifying logical "1") of the output 45a should be used as a condition for permitting the transaction. This will prevent erroneous operation which may occur if the solar battery breaks down or disconnection occurs. An alternative is to obtain the logical product of the power supply voltage $V_{DD}$ and the output ("1" signifies "LOW") of the terminal 55. The AND gate for such purposes can be built in either in the external teminal equipment, as in FIG. 2, or in the IC card itself.

As has been described, the information storage circuit employs a simple circuit configuration but it keeps the stored information intact even if the power supply voltage disappears or drops. Therefore, when employed in IC cards using a solar battery, the above-described circuit keeps the output information even if the power supply voltage disappears due to insufficient amount of light falling on the solar battery. Moreover, since the information at the output terminal automatically is deactivated after a fixed time interval, the circuit also ensures the security of the IC card.

The circuit of the above-described embodiment can achieve fixed time intervals of 30 minutes to one hour which is relatively long and is suitable for use in IC cards.

What is claimed is:

1. An IC card having a self-identification function in the card itself, comprising:
   an input means for inputting a primary personal identification number and a secondary personal identification number;
   a storage means for storing a primary reference personal identification number and a secondary reference personal identification number;
   a primary comparing means for comparing the primary personal identification number input by use of the input means with the primary personal identification number prerecorded in said storage means;
   a secondary comparing means for comparing the secondary personal identification number input using the input means with the secondary personal identification number prerecorded in said storage means;
   a personal identification number match memory comprising an electrically erasable programmable read-only memory for storing data indicating that a match has been found by said primary comparing means and for producing a first signal representing said data;
   a timer circuit triggered into a first state when a match is found by said primary comparing means or by said secondary comparing means, and maintaining said first state for a predetermined interval and producing a second signal while said first state is maintained;
   external terminals for outputting, to the outside of the IC Card, said signal produced by said personal identification number match memory and said signal produced by said timer circuit;
   an additional external terminal for receiving a third signal from outside of the IC card, said personal identification number match memory receiving said third signal and said data being erased upon receipt of said third signal.

2. An IC card according to claim 1, wherein said timer circuit comprises an information storage circuit comprising:
   an input terminal;
   a first FET having a gate connected to the input terminal, and having a drain connected to a power supply;
   a capacitor connected between a source of the first FET and ground;
   a second FET having a gate connected to the source of the first FET, and having a source which is grounded and having a drain connected to an output terminal; and
   a means for applying a pulse to the input terminal when a match has been found by said primary comparing means to charge said capacitor;
   wherein, when a pulse is applied to the input terminal, information is maintained at the output terminal for a predetermined time determined by the capacitance of the capacitor and the leakage current, even if the voltage of the power supply disappears or drops.

3. An IC card according to claim 2, wherein said means applying a pulse applies a pulse which is greater than the sum of the power supply voltage and the threshold voltage of the first FET.

4. An IC card according to claim 1, wherein said match memory produces a high level output when a match is found by said primary comparing means.

5. An IC card according to claim 2, wherein said power supply comprises a solar battery.

6. An IC card according to claim 3, wherein said means applying a pulse comprises a level shifter responsive to a logic level within the voltage range of the power supply and producing a pulse exceeding the voltage range of the power supply.

7. An IC card according to claim 1, wherein said storage means comprises a read-only memory.

8. An IC card according to claim 7, wherein said read-only memory comprises an electrically erasable programmable read-only memory.

9. A transaction system comprising transaction terminal equipment and an IC card inserted in said transaction terminal equipment when the transaction is made; wherein said IC card comprises:
  an input means for inputting a primary personal identification number and a secondary personal identification number;
  a storage means for storing a primary reference personal identification number and a secondary reference personal identification number;
  a primary comparing means for comparing the primary personal identification number input using the input means with the primary reference personal identification number prerecorded in said storage means;
  a secondary comparing means for comparing the secondary personal identification number input using the input means with the secondary reference personal identification number prerecorded in said storage means;
  a personal identification number match memory for storing data indicating that a match has been found by said primary comparing means and for producing a first signal representing said data; and
  a timer circuit for triggering into a first state when a match is found by said primary comparing means or by secondary comparing means, and for maintaining said first state for a predetermined interval and for producing a second signal while said first state is maintained;
  and wherein said transaction terminal equipment comprises:
  a transaction enable/disable section for enabling a transaction when it receives said first and second signals from the IC card; and
  a means for producing a third signal when the transaction is effected;
  said data in said personal identification number match memory being erased when said third signal is received.

10. A transaction method using an IC card in combination with transaction terminal equipment, comprising the steps of:
  inputting, into the IC card, a primary personal identification number;
  comparing the input primary personal identification number with a primary reference personal identification number stored in the IC card;
  storing data indicating that said input primary personal identification number and said primary reference personal identification number are found to match;
  outputting a first signal representing said stored data as long as said data is stored;
  triggering a timer into a first state when said input primary personal identification number and said primary reference personal identification number are found to match, said timer being kept in said first state for a predetermined period after said triggering;
  inputting, when said predetermined period has expired after said triggering and said timer is therefore not in said first state, into the IC card, a secondary personal identification number;
  comparing the input secondary personal identification number with a secondary reference personal identification number stored in the IC card;
  retriggering, when the input secondary personal identification number and the secondary reference personal identification number are found to match;
  said timer being kept in said first state for said predetermined period after said retriggering;
  outputting a second signal as long as said timer is in said first state;
  transmitting said first and second signals when said IC card is inserted into said transaction terminal equipment;
  permitting a transaction using the transaction terminal equipment when said IC card is inserted into said transaction terminal equipment and both said first signal and said second signal are active;
  transmitting a third signal when the transaction is effected; and
  erasing said data upon receipt of said third signal.

* * * * *